J. T. ROSS.
Trimming.

No. 161,552. Patented March 30, 1875.

Witnesses:
L. F. Brous
A. P. Grant

Inventor:
John T. Ross.
by
John A. Diedersheim.
Atty.

THE GRAPHIC CO. PHOTO-LITH. 39 & 41 PARK PLACE, N.Y.

UNITED STATES PATENT OFFICE.

JOHN T. ROSS, OF PHILADELPHIA, PENNSYLVANIA.

IMPROVEMENT IN TRIMMINGS.

Specification forming part of Letters Patent No. 161,552, dated March 30, 1875; application filed March 8, 1875.

*To all whom it may concern:*

Be it known that I, JOHN T. ROSS, of the city and county of Philadelphia and State of Pennsylvania, have invented a new and useful Improvement in Trimming; and I do hereby declare the following to be a clear and exact description of the nature thereof, sufficient to enable others skilled in the art to which my invention appertains, to fully understand, make, and use the same, reference being had to the accompanying drawings, making part of this specification, in which—

Figure 1:
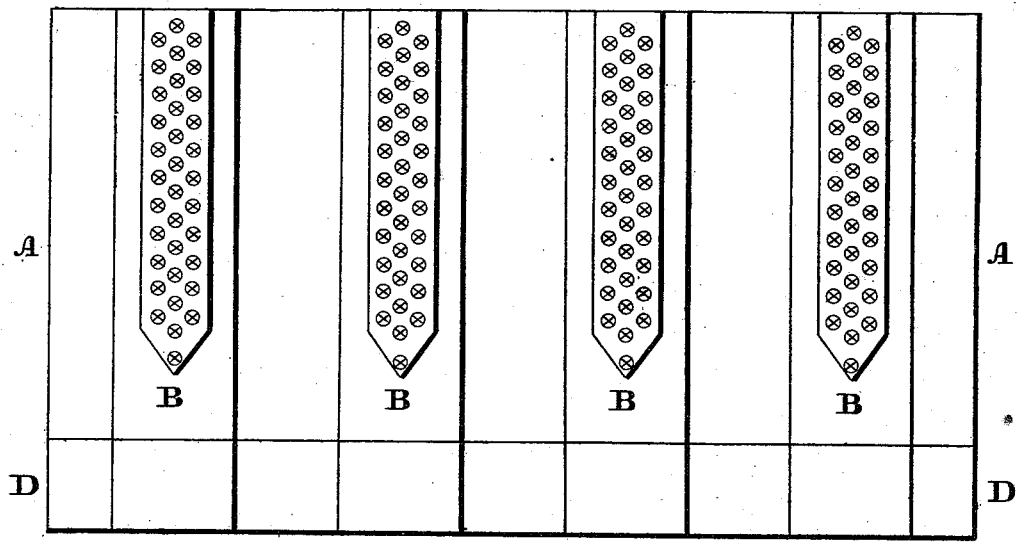
Figure 2:
Figure 3:
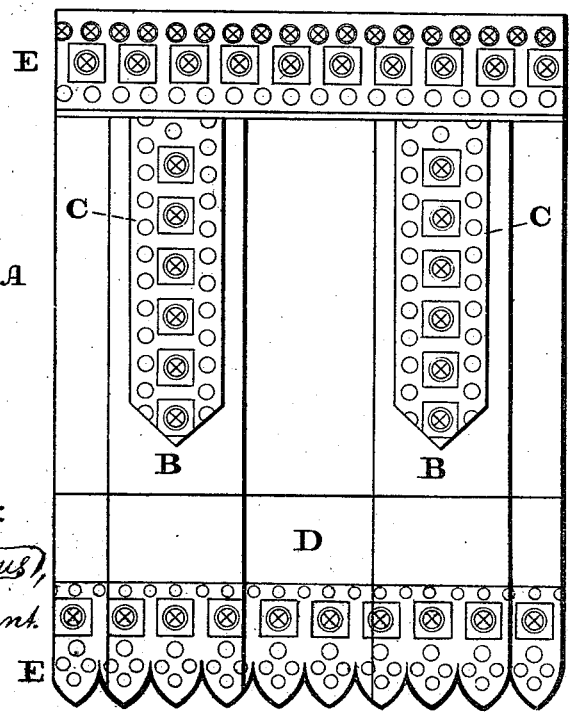

Figures 1 and 3 are face views of the device embodying my invention. Fig. 2 is a longitudinal section thereof.

Similar letters of reference indicate corresponding parts in the several figures.

My invention consists in trimming constructed of a body which at intervals is formed into plaits which are partly occupied by insertings, the trimming being prepared in lengths, so that any dimension may be cut therefrom. It also consists in the plaited body having finishing-borders of edging forming a new article of prepared trimming.

Referring to the drawings, A represents the length of the body, which may be of Marseilles cambric, or other suitable material. B B represents a series of plaits, which are formed in the body at intervals, and extend at an angle to the length of the body. The faces of the plaits B B are occupied by insertings C C, which are thus part of the visible faces of the plaits. A hem, D, will be formed on one side of the length of the body.

This prepared trimming is made in lengths or long strips, as a convenient and ready article of service, from which pieces of various dimensions may be removed relatively to the requirements of dresses, skirts, pillows, and trimmings generally.

To the sides of the length of the body I secure edging or inserting E, which constitutes the borders of the trimming, and finish therefor.

Having thus described my invention, what I claim as new, and desire to secure by Letters Patent, is—

1. As a new article of manufacture, trimming composed of a body, A, with plaits B, in combination with inserting C, constituting portions of the visible faces of the plaits, substantially as and for the purpose set forth.

2. The body A, plaits B, inserting C in said plaits, and border E, combined and arranged substantially as and for the purpose set forth.

JNO. T. ROSS.

Witnesses:
JOHN A. WIEDERSHEIM,
ALBERT H. HOECKLEY.